Nov. 29, 1927.

V. I. ZELOV 1,650,736

HYDRAULIC TESTING APPARATUS

Filed Sept. 15, 1926

WITNESSES:
A. Frank Schwendner

INVENTOR
Victor I. Zelov
BY Henry L. Jennings
ATTORNEY

Patented Nov. 29, 1927.

1,650,736

UNITED STATES PATENT OFFICE.

VICTOR I. ZELOV, OF ROSEMONT, PENNSYLVANIA.

HYDRAULIC TESTING APPARATUS.

Application filed September 15, 1926. Serial No. 135,543.

My invention relates to hydraulically operated testing apparatus, and has for its object the provision of such apparatus which shall be simple of design, easy of manufacture and which shall be capable of accurately delivering a predetermined fluid pressure to a device to be tested.

A further object of my invention is to provide apparatus of the character designated which shall be effective to accurately and automatically provide a predetermined pressure for testing and to automatically indicate the pressure effect of leakage in the testing apparatus or in the apparatus to be tested.

A still further object of my invention is to provide a hydraulically operated testing apparatus capable of accurately delivering a predetermined fluid pressure, in a relatively large volume to a plurality of objects to be tested, whereby such work may be carried on with dispatch and the labor connected therewith greatly reduced.

Figure 1:
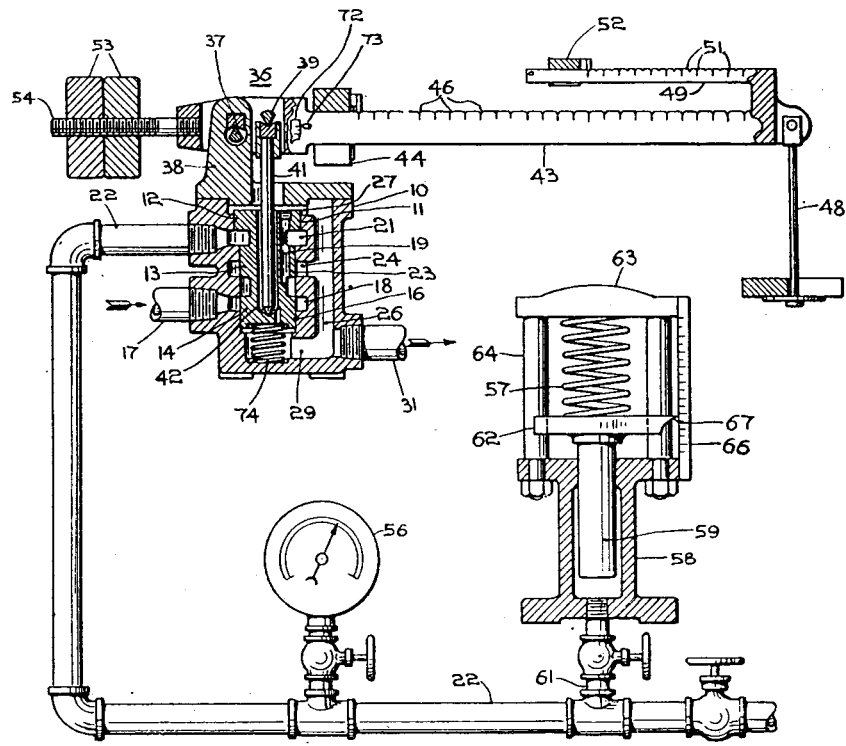
Figure 2:
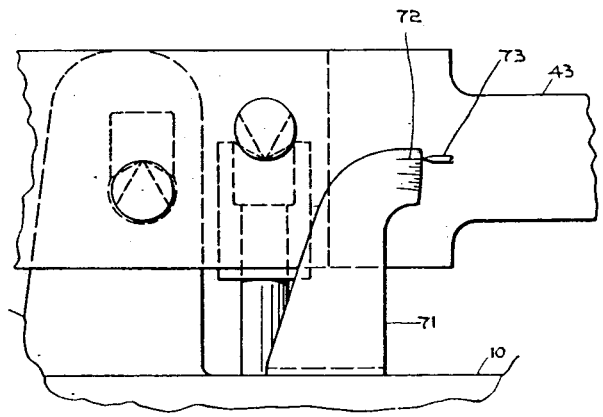

Apparatus embodying features of my invention is illustrated in the accompanying drawing forming a part of this specification, wherein Fig. 1 is a side elevation, partly in section, showing my improved apparatus together with certain devices adapted to be tested thereby; and, Fig. 2 is a detail view, drawn to a larger scale, and showing my improved means for indicating leakage in the apparatus being tested or in the communications therewith.

Briefly, my invention comprises a housing associated with a source of fluid pressure, and containing a piston and a valve member carried by the piston. The housing and the valve member are both provided with cooperating ports and passages, whereby when a displacement force is exerted on the piston, the valve member is moved to admit fluid pressure to one side of the piston in opposition to the displacement force. As soon as the displacement force is balanced by the fluid pressure acting on the piston, the valve is moved to cut off the flow of fluid thereto. The space on the active side of the piston is connected to a device to be tested so that the apparatus delivers a fluid pressure for testing purposes which is a function of the displacement force. Should any leakage occur in the delivery line or in the device to be tested, the pressure on the active side of the piston is diminished and the valve moves to admit more fluid under pressure thereto.

In order to accurately determine the displacement force applied to the piston, I arrange it for up and down movement and arrange a weighted scale beam lever to bear thereon. In addition, I provide a vernier scale for indicating fractional units of the displacement force and also provide means for indicating the amount of leakage which may occur in the device being tested or in its communicating connections. In this manner the most accurate determination of the fluid pressure utilized for testing may be had.

Referring now to the drawings for a better understanding of my invention, I show in Fig. 1, at 10, a housing. The housing 10 is made hollow and defines a cylinder 11 in which is disposed an operating piston 12. The cylinder 11 is so arranged that the piston 12 has an up and down movement in order to utilize the force of gravity to act thereon in a way to be more particularly described hereinafter.

The piston 12 is provided with a downwardly extending stem portion 13, said stem portion carrying at its lower extremity a valve member 14. The valve member 14 has an approximately fluid tight fit with a reduced cylindrical portion 16 provided in the housing.

The housing 10 communicates through a conduit 17 with any suitable source of fluid pressure, preferably oil under pressure, said pressure being at all times above that which it is desired to utilize for testing. Fluid pressure from the conduit 17 is delivered to a passage 18 provided in the housing to the reduced cylindrical portion 16. With the valve 14 in the position shown in the drawing, the passage 18 is closed by said valve so that no fluid under pressure can enter the cylindrical portion. Should the piston 12 be moved downwardly, carrying with it the valve 14, it will be seen that fluid pressure is admitted to the space above said valve 14.

Within the stem portion 13 of the piston 12 is provided a passage 19 communicating with the space above the valve 14 and with the cylinder 11 below the piston 12. In this way fluid pressure admitted by the valve 14 acts to force the piston 12 upwardly and to counteract any downward displacement force.

The space beneath the piston 12 communicates through a passage 21 with a conduit 22 adapted to deliver fluid under pressure to a device or devices to be tested, so that whatever pressure is beneath said piston 12 also exists in the conduit 22, except for such leakage as might possibly occur in the conduit or in the devices being tested.

The stem portion 13 of the piston 12 also carries a valve member 23, the function of which is to exhaust fluid under pressure from beneath the piston 12 in case the fluid pressure acting upon said piston exerts a greater force than the downward displacement force acting thereon. In the position shown in the drawing, the valve 23 is indicated in cut-off position with respect to an exhaust passage 24 provided in the housing 10. The exhaust passage 24 communicates with a drain passage 26, said drain passage also communicating through passages 27 and 29 with the space above the piston 12 and the space below the valve 14 respectively. Any leakage of fluid which might occur past the piston 12 or past the valve 14 is conveyed through the passage 26 and a conduit 31, communicating therewith, to any suitable place away from the apparatus, or it might be arranged to be utilized over again, all as is well understood in the art.

In order that an accurately predetermined displacement force may be exerted on the piston 12 in opposition to the fluid pressure, I provide a weighted scale beam lever 36 adapted to exert a downward force on said piston 12. The scale beam lever 36 is pivoted at 37 to a member 38 carried by the housing 10. Its fulcrum, shown at 39, bears upon a stem 41 which extends downwardly into a recess 42 provided in the piston 12 and stem 13. The power arm of the lever 36, shown at 43, is provided with a sliding weight 44 and with graduations 46 for measuring and indicating the displacement force bearing downwardly on the piston 12. In order to apply a predetermined initial force to the power arm 36, greater than that which could be applied with the weight 44, a weight holder 48 may be provided on the end of the beam such as is ordinarily provided in balanced scales.

The power arm 43 of the lever 46 is also provided with a supplemental arm 49 having graduations 51 provided thereon and provided with a small sliding weight 52 capable of effecting a downward force on the fulcrum 49 through the power arm 43 in fractions of units of those indicated by the sliding weight 44.

In order that the weight of the power arm 43 and its associated parts may be counterbalanced before testing, I provide counterbalance weights 53 movable along a stem 54 and disposed on the opposite side of the pivot 37 from the power arm 43.

Fluid under pressure delivered through the conduit 22 may be utilized in many ways, for example, it might be utilized for testing the indications of a pressure gauge 56 or for testing the scale of a spring 57. The means for testing the spring 57 may comprise a cylinder 58 having a piston 59 disposed therein and adapted to be moved upwardly by the fluid pressure beneath it. Fluid pressure may be conveyed to the cylinder 58 by the conduit 22 and a branch conduit 61. The force exerted by the piston 59 is transmitted to the spring 57 through a movable abutment 62 bearing upwardly against the spring. The upper end of the spring is held in position by means of a yoke 63 which is in turn secured to the cylinder 58 by means of a plurality of bolts 64. At the right of the apparatus is shown a gauge 66 which may be graduated in any suitable units. A pointer 67 carried by the abutment 62 indicates the amount of deflection of the spring when compressed by action of the abutment 62. Inasmuch as my improved apparatus is capable of delivering an accurately measured fluid pressure to the cylinder 58, the spring 57 may thus be tested and its behavior under operating conditions accurately determined.

From the foregoing description it will be apparent that should any leakage occur in the testing apparatus past the piston 12 to the drain, past the valve 23 to the exhaust, in the conduit 22, or in any of the apparatus being tested, it will tend to reduce the pressure within the cylinder 11 acting upon the piston 12. This reduction in pressure would cause the power arm 43 of the lever 36 to move the piston 12 and valve 14 downwardly a sufficient amount to allow fluid under pressure to pass the valve 14 into the cylinder 11 to compensate for such leakage. The power arm 43 would thus assume a lower position, on account of the leakage, than it would assume without such leakage. It will be apparent that leakage in any of the points outlined would also tend to reduce the pressure acting upon the devices being tested and the indications of the weights 44 and 52 would be slightly in error. In order to indicate the extent of such inaccuracies which might occur on account of leakage, I provide, as best shown in Fig. 2, a stationary member 71 carried by the housing 10 and having marked thereon a plurality of graduations 72. The stationary member 71 extends upwardly from the housing 10 alongside the power arm 43 of the lever 36. There is provided on the power arm 43, opposite the graduation 72, a pointer 73 which indicates the position of said lever 43 with respect to the housing and thus shows when the lever 43 must assume a lower position to compensate for leakage from beneath the piston 12 or connections therewith. The greater such leakage is, the lower the lever arm 43 must move in order to move the valve 14 to compensate for such leakage.

In order that the valve member 14 may be perfectly balanced to compensate for its own dead weight and the dead weight of associated parts utilized to transmit the force of the power arm 43 thereto, I provide a spring 74 beneath said valve member and bearing upwardly thereagainst. The spring 74 is of a determined scale, or has a determined deflection for a given displacement force. When ever there is leakage in the system causing the lever arm 43 to assume a lower position to compensate therefor, the valve 14 is caused to assume a lower position deflecting the spring 74. The indications of the gauge 72 and pointer 73 therefore register the deflection of the spring 74 and thus the pressure effect of the leakage in the system. Correction to the indications of the weights 44 and 52 may then be made to compensate for the pressure effect of the leakage.

Having thus described my invention, the operation thereof is as follows. Assume that the devices 56 and 57 are in position to be tested and connected to the conduit 22 and that fluid under a sufficient pressure is being conveyed to the apparatus through the conduit 17. The weights 44 and 52 are then set to indicate the pressure at which it is desired to test the devices 56 and 57. The force exerted by the weights 44 and 52 is transmitted downwardly to the piston 12 through the fulcrum 39 and stem 41 causing it to move downwardly. Upon downward movement of the piston 12, the valve 14 is moved downwardly and fluid under pressure is admitted through passage 18 and through the passage 19 to the space beneath the piston 12 forcing it upwardly. As soon as the pressure beneath said piston 12 is sufficient to balance the force exerted by the power arm 43 of the lever 36, the valve 14 is moved to cut off the fluid pressure entering the cylinder 11 and the apparatus comes to rest in the position shown in the drawing. Inasmuch as the space beneath the piston 12 is at all times in communication through the conduit 22 with the devices to be tested, the reading of the gauge 56 and the compression of the spring 57 can be noted at the predetermined pressure. Should it be desired to increase the pressure acting upon the devices 56 and 57 the weight 44 or 52 or both, may be moved to increase the force exerted by the power arm 43 whereupon the operations just described will reoccur.

Should it be desired to decrease the pressure acting upon the devices 56 and 57 the weight 44 or 52 or both, may be moved inwardly of the power arm 43. When the weights 44 or 52 or both, are moved inwardly of the power arm 43, the downward force exerted thereby and acting upon the piston 12 is decreased and the fluid pressure beneath said piston is now greater than the downward force being exerted thereupon. The greater force of the fluid pressure causes said piston to raise carrying with it the valve member 14 and allowing some of the fluid pressure from beneath said piston to pass to the exhaust through the passage 24 and passage 26. The pressure acting upon the devices 56 and 57 is thus immediately reduced to that determined by the settings of the weights 44 and 52.

Should leakage occur past the piston 12 or in any of the connections to the space beneath said piston, the power arm 43 holds the piston 12 and valve 14 downwardly slightly compressing the spring 74 so that the valve 14 remains open sufficiently to continuously pass an amount of fluid thereby equivalent to the leakage occurring less the counteracting force exerted by the spring 74 under compression. This position of the power arm 43 and valve 14 is shown by the pointer 73 and graduations 72 so that the pressure effect of the leakage is known and corrections may be made to the readings established by the weights 44 and 52 to compensate for the effect of such leakage.

From the foregoing it will be apparent that I have devised an improved hydraulically operated testing apparatus capable of accurately measuring and delivering a predetermined pressure to the apparatus to be tested and which is simple of operation and capable of greatly reducing the operations ordinarily required for such work.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:—

1. In a hydraulic testing apparatus, the combination with a source of fluid pressure, of a valve member for establishing communication between the source of fluid pressure and a point of delivery in response to a displacement force, means carried by the valve member and utilizing the fluid pressure delivered as a medium to move said valve and cut off said communication when the force exerted by said delivered pressure equals the displacement force, lever means for applying the displacement force, and spring means for compensating for the dead weight of the lever means.

2. In a hydraulic testing apparatus, the combination with a source of fluid pressure, of a valve member for establishing communication between the source of fluid pressure and a point of delivery in response to a displacement force, means carried by the valve member and utilizing the fluid pressure delivered as a medium to move said valve and cut off said communication when the force exerted by said delivered pressure equals the displacement force, lever and weight means for applying a predetermined displacement force, and a spring having a definite scale offsetting the dead weight of the lever and weight means.

3. In a hydraulic testing apparatus, the combination with a source of fluid pressure, of means movable in response to fluid pressure in opposition to a displacement force and adapted to deliver fluid under pressure to the device to be tested in units of pressure which are a function of the displacement force, a weighted lever for exerting a displacement force on the element, means carried by the lever for indicating the amount of displacement force exerted, and other means cooperating with the lever for indicating leakage in the device to be tested or in the fluid pressure containers connected therewith.

4. In a hydraulic testing apparatus, the combination with a source of fluid pressure, of a housing defining a cylinder having a piston therein and adapted for up and down movement, a valve member carried by the piston and adapted when moved in a downward direction to admit fluid under pressure to one side of the piston in opposition to a downward displacement force and to cut off said fluid pressure when said displacement force is equaled, a lever having its fulcrum carried by the piston, a weight carried by the power arm of the lever and adapted to exert a downward displacement force on the piston, and means for indicating the force exerted by the weight.

5. In a hydraulic testing apparatus adapted to be associated with a device to be tested, the combination with a source of fluid pressure, of a housing defining a cylinder having a piston therein and adapted for up and down movement, said housing having suitable ports and passages communicating with the source of fluid pressure, with the device to be tested, and with the exhaust, valve means movable with the piston and having ports and passages cooperating with the ports and passages of the housing whereby fluid pressure is admitted beneath the piston to maintain a balance against any downward force acting on said piston and whereby fluid pressure is exhausted from beneath the piston whenever the force exerted thereby is greater than the displacement force, a lever pivoted to a stationary part, a fulcrum for the lever and carried by the piston, a power arm for the lever graduated in units of force, a weight slidable along said power arm and imposing a determinable downward displacement force on the piston, and conduit means connecting the space beneath the piston to the device to be tested.

6. In a hydraulic testing apparatus adapted to be associated with a device to be tested, the combination with a source of fluid pressure, of a housing defining a cylinder having a piston therein and adapted for up and down movement, said housing having suitable ports and passages communicating with the source of fluid pressure, with the device to be tested, and with the exhaust, valve means movable with the piston and having ports and passages cooperating with the ports and passages of the housing whereby fluid under pressure is admitted beneath the piston to maintain a balance against any downward force acting on said piston and whereby fluid under pressure is exhausted from beneath the piston whenever the force exerted thereby is greater than the displacement force, a lever pivoted to a stationary part, a fulcrum for the lever and carried by the piston, a power arm for the lever graduated in units of force, a weight slidable along said power arm and imposing a determinable downward displacement force on the piston, and means for indicating the pressure effect of leakage in said conduit or said device to be tested.

7. In a hydraulic testing apparatus adapted to be associated with a device to be tested, the combination with a source of fluid pressure, of a housing defining a cylinder having a piston therein and adapted for up and down movement, said housing having suitable ports and passages communicating with the source of fluid pressure, with the device to be tested, and with the exhaust, valve means movable with the piston and having ports and passages cooperating with the ports and passages of the housing whereby fluid under pressure is admitted beneath the piston to maintain a balance against any downward force acting on said piston and whereby fluid under pressure is exhausted from beneath the piston whenever the force exerted thereby is greater than the displacement force, a lever pivoted to a stationary part, a fulcrum for the lever and carried by the piston, a power arm for the lever graduated in units of force, a weight slidable along said power arm and imposing a determinable downward displacement force on the piston, means for indicating the pressure effect of leakage in said conduit or said device to be tested, and a spring for counterbalancing the dead weight of the valve member and parts bearing thereon.

8. In a hydraulic testing apparatus adapted for association with a device to be tested, the combination with a source of fluid pressure, of a housing defining a cylinder having a piston therein and adapted for up and down movement, said housing having suitable ports and passages communicating with the source of fluid pressure, with the device to be tested and with the exhaust, valve means movable with the piston and having ports and passages cooperating with the ports and passages of the housing whereby fluid under pressure is admitted beneath the piston and to the device to be tested to maintain a balance against any downward force acting on said piston and whereby fluid under pressure is exhausted from beneath the piston whenever the force exerted by said fluid pressure is greater than the displacement force, and a scale beam lever having a movable weight thereon adapted to exert a downward displacement force on the piston.

9. In a hydraulic testing apparatus adapted for association with a device to be tested, the combination with a source of fluid pressure, of a housing communicating with the source of fluid pressure and the device to be tested, means in the housing movable in response to fluid pressure in opposition to a displacement force and adapted to deliver fluid under pressure to the device to be tested in units which are a function of the displacement force, a lever pivoted to the housing, a fulcrum for the lever and operatively connected to said means, and a power arm for the lever having a movable weight provided thereon and marked with graduations to indicate the units of force exerted by the weight.

10. In a hydraulic testing apparatus adapted for association with a device to be tested, the combination with a source of fluid pressure, of a housing communicating with the source of fluid pressure and the device to be tested, means in the housing movable in response to fluid pressure in opposition to a displacement force, a lever pivoted to the housing, a fulcrum for the lever and operatively connected to said means, a power arm for the lever having a movable weight provided thereon and marked with graduations to indicate the units of force exerted by the weight, and a supplementary power arm provided on the lever and having graduations and a lesser movable weight for indicating fractions of the units of force indicated by the first-mentioned weight.

11. In a hydraulic testing apparatus adapted for association with a device to be tested, the combination with a source of fluid pressure, of a housing communcating with the source of fluid pressure and the device to be tested, means in the housing movable in response to fluid pressure in opposition to a displacement force and adapted to deliver fluid under pressure to the device to be tested in units which are a function of the displacement force, a lever pivoted to the housing, a fulcrum for the lever and operatively connected to said means, a power arm for the lever having a movable weight provided thereon and marked with graduations to indicate the units of force exerted by the weight, a supplementary power arm provided on the lever and having graduations and a lesser movable weight for indicating fractions of the units of force indicated by the first-mentioned weight, and cooperating means carried by the housing and the lever for indicating fluid pressure leakage in the device to be tested or the means communicating therewith.

12. In a hydraulic testing apparatus adapted for association with a device to be tested, the combination with a source of fluid pressure, of a housing communicating with the source of fluid pressure and the device to be tested, means in the housing movable in response to fluid pressure in opposition to a displacement force and adapted to deliver fluid under pressure to the device to be tested in units which are a function of the displacement force, a lever pivoted to the housing, a fulcrum for the lever and operatively connected to said means, a power arm for the lever having a movable weight provided thereon and marked with graduations to indicate the units of force exerted by the weight, a supplementary power arm provided on the lever and having graduations and a lesser movable weight for indicating fractions of the units of force indicated by the first-mentioned weight, a graduated arm carried by the housing, and indicating means carried by the lever and cooperating with the arm on the housing for indicating leakage in the device to be tested or the means communicating therewith.

In testimony whereof, I have hereunto subscribed my name this first day of September, 1926.

VICTOR I. ZELOV.